(12) United States Patent
Kuwahara et al.

(10) Patent No.: US 11,420,481 B2
(45) Date of Patent: Aug. 23, 2022

(54) PNEUMATIC TIRE

(71) Applicant: The Yokohama Rubber Co., LTD., Tokyo (JP)

(72) Inventors: Noboru Kuwahara, Tokyo (JP); Masataka Kubota, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 259 days.

(21) Appl. No.: 16/485,757

(22) PCT Filed: Nov. 7, 2017

(86) PCT No.: PCT/JP2017/040161
§ 371 (c)(1),
(2) Date: Aug. 13, 2019

(87) PCT Pub. No.: WO2018/150650
PCT Pub. Date: Aug. 23, 2018

(65) Prior Publication Data
US 2020/0130422 A1    Apr. 30, 2020

(30) Foreign Application Priority Data
Feb. 14, 2017    (JP) .............................. JP2017-025066

(51) Int. Cl.
*B60C 13/00*    (2006.01)
(52) U.S. Cl.
CPC .................................. *B60C 13/001* (2013.01)
(58) Field of Classification Search
CPC ........ B60C 13/001; B60C 13/00; B60C 13/02
See application file for complete search history.

(56) References Cited

U.S. PATENT DOCUMENTS

D740,747 S   * 10/2015  Sato ............................ D12/605
2012/0055603 A1  3/2012  Tokizaki
(Continued)

FOREIGN PATENT DOCUMENTS

JP    H07-164831    6/1995
JP    2004-224342   8/2004
(Continued)

OTHER PUBLICATIONS

JP 2012148651 Machine Translation; Masahiro, Ebiko (Year: 2012).*
(Continued)

*Primary Examiner* — Robert C Dye
*Assistant Examiner* — Nicholas J Weiler
(74) *Attorney, Agent, or Firm* — Thorpe North & Western

(57)  ABSTRACT

A pneumatic tire includes a decorative portion on a tire side portion that is an outer surface of a sidewall portion. The decorative portion includes a plurality of ridges that extend along the tire side portion and are arranged side by side in the tire circumferential direction. The plurality of ridges include a common form of an inclination angle in the tire circumferential direction with respect to the tire radial direction and an interval between a pair of the plurality of ridges adjacent. The plurality of ridges constitute a ridge group. Three or more ridge groups are provided and the plurality of ridges of the different ridge groups are arranged intersecting one another. Accordingly, the pneumatic tire can reduce poor appearance of the sidewall portion.

7 Claims, 17 Drawing Sheets

(56) References Cited

U.S. PATENT DOCUMENTS

| | | | | |
|---|---|---|---|---|
| 2012/0273101 A1* | 11/2012 | Iwabuchi | ................ | B60C 5/00 |
| | | | | 152/151 |
| 2014/0174623 A1* | 6/2014 | Mukai | ................... | B60C 13/02 |
| | | | | 152/523 |
| 2014/0326385 A1 | 11/2014 | Sato | | |
| 2015/0321523 A1 | 11/2015 | Takahashi | | |

FOREIGN PATENT DOCUMENTS

| | | |
|---|---|---|
| JP | 2011-037387 | 2/2011 |
| JP | 2012-056416 | 3/2012 |
| JP | 2012-148651 | 8/2012 |
| JP | 2014-136487 | 7/2014 |
| JP | 2016-215698 | 12/2016 |
| WO | WO 2013/073128 | 5/2013 |

OTHER PUBLICATIONS

European Search Report for European Application No. 17896365.8 dated Oct. 16, 2020, 7 pages, Germany.
International Search Report for International Application No. PCT/JP2017/040161 dated Dec. 19, 2017, 4 pages, Japan.

\* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 |
|---|---|---|---|---|---|---|---|
| NUMBER OF RIDGE GROUPS | 1 | 2 | 3 | 3 | 3 | 3 | 4 |
| PRESENCE OF DIFFERENCE IN HEIGHT OF RIDGE BETWEEN RIDGE GROUPS | - | NO | NO | YES | NO | YES | NO |
| PLURALITY OF INTERVALS OF RIDGES IN RIDGE GROUP | - | NO | NO | NO | YES | YES | NO |
| DIFFICULTY IN VISIBILITY OF RECESS IN TIRE SIDE PORTION | 100 | 101 | 102 | 103 | 108 | 110 | 105 |

FIG. 17A

| | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|
| NUMBER OF RIDGE GROUPS | 4 | 4 | 4 | 5 | 5 | 5 | 5 |
| PRESENCE OF DIFFERENCE IN HEIGHT OF RIDGE BETWEEN RIDGE GROUPS | YES | NO | YES | NO | YES | NO | YES |
| PLURALITY OF INTERVALS OF RIDGES IN RIDGE GROUP | NO | YES | YES | NO | NO | YES | YES |
| DIFFICULTY IN VISIBILITY OF RECESS IN TIRE SIDE PORTION | 106 | 110 | 112 | 106 | 107 | 112 | 113 |

FIG. 17B

PNEUMATIC TIRE

TECHNICAL FIELD

The present technology relates to a pneumatic tire.

BACKGROUND ART

In the related art, many known pneumatic tires have markings including alphanumerics, symbols, patterns, or the like formed on the surface of their sidewall portion. However, in such a pneumatic tire, large distortion is readily generated in the sidewall portion. Thus, cracks are readily generated on the surface when the marking is provided on a portion with large distortion. In some of known pneumatic tires, generation of cracks is suppressed. For example, Japan Unexamined Patent Publication No. 2004-224342 describes a pneumatic tire including an annular decorative body provided on the surface of a sidewall portion and a large number of ridges provided on the surface of the decorative body at equal intervals in the circumferential direction together with markings. On the surface of the markings, ridges having an interval different from the interval of the ridges provided on the decorative body are also included. Thus, cracks in the markings are suppressed and visibility of the markings is ensured.

Here, the sidewall portion is visible externally when the tire is mounted on a vehicle. Accordingly, appearance is more important in comparison with other portions of the pneumatic tire. Additionally, inward of the sidewall portion, an end portion of a turned-up portion of a carcass is located. When inflation is performed, a step on the end portion of the turned-up portion readily reveals irregularities of the surface. The surface irregularities of the sidewall portion leads to deterioration in appearance, i.e., leads to poor appearance. Thus, the sidewall portion has room for further improvement in reducing poor appearance.

SUMMARY

The present technology provides a pneumatic tire that can reduce poor appearance of a sidewall portion.

A pneumatic tire according to an embodiment of the present technology includes a decorative portion disposed on a tire side portion that is a outer surface of a sidewall portion. The decorative portion includes a plurality of ridges that extend along the tire side portion and are arranged side by side in a tire circumferential direction. The plurality of ridges include a common form of an inclination angle in the tire circumferential direction with respect to a tire radial direction and an interval between a pair of the plurality of ridges adjacent to one another. The plurality of ridges form a ridge group. Three or more of the ridge groups are provided and the plurality of ridges of the different ridge groups are arranged intersecting one another.

Additionally, in the pneumatic tire described above, the plurality of ridges of the same ridge group preferably have an identical height to one another, and the plurality of ridges of the different ridge groups preferably have different heights.

Additionally, in the pneumatic tire described above, at least one of the ridge groups preferably has a plurality of sizes of interval as an interval between a pair of the plurality of ridges adjacent to one another.

Additionally, in the pneumatic tire described above, the ridge group that includes a plurality of sizes of interval as an interval between the pair of the plurality of ridges adjacent to one another has a ridge set formed by a plurality of ridges arranged side by side in a continuous manner in the tire circumferential direction. A plurality of the ridge sets are preferably arranged side by side in the tire circumferential direction at an interval different from the interval between the plurality of ridges that form the ridge set.

A pneumatic tire according to an embodiment of the present technology can provide the effects of reducing poor appearance of a sidewall portion.

BRIEF DESCRIPTION OF DRAWINGS

FIG. 17A is a table showing results of performance tests of a pneumatic tire according to an embodiment.

FIG. 17B is a table showing results of performance tests of a pneumatic tire according to an embodiment.

DETAILED DESCRIPTION

Pneumatic tires according to embodiments of the present technology are described in detail below with reference to the drawings. However, the present technology is not limited by the embodiment. Constituents of the following embodiments include elements that are substantially identical or that can be substituted or easily conceived by one skilled in the art.

Hereinafter, "tire lateral direction" refers to the direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction. Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

Pneumatic Tire

Figure 1:
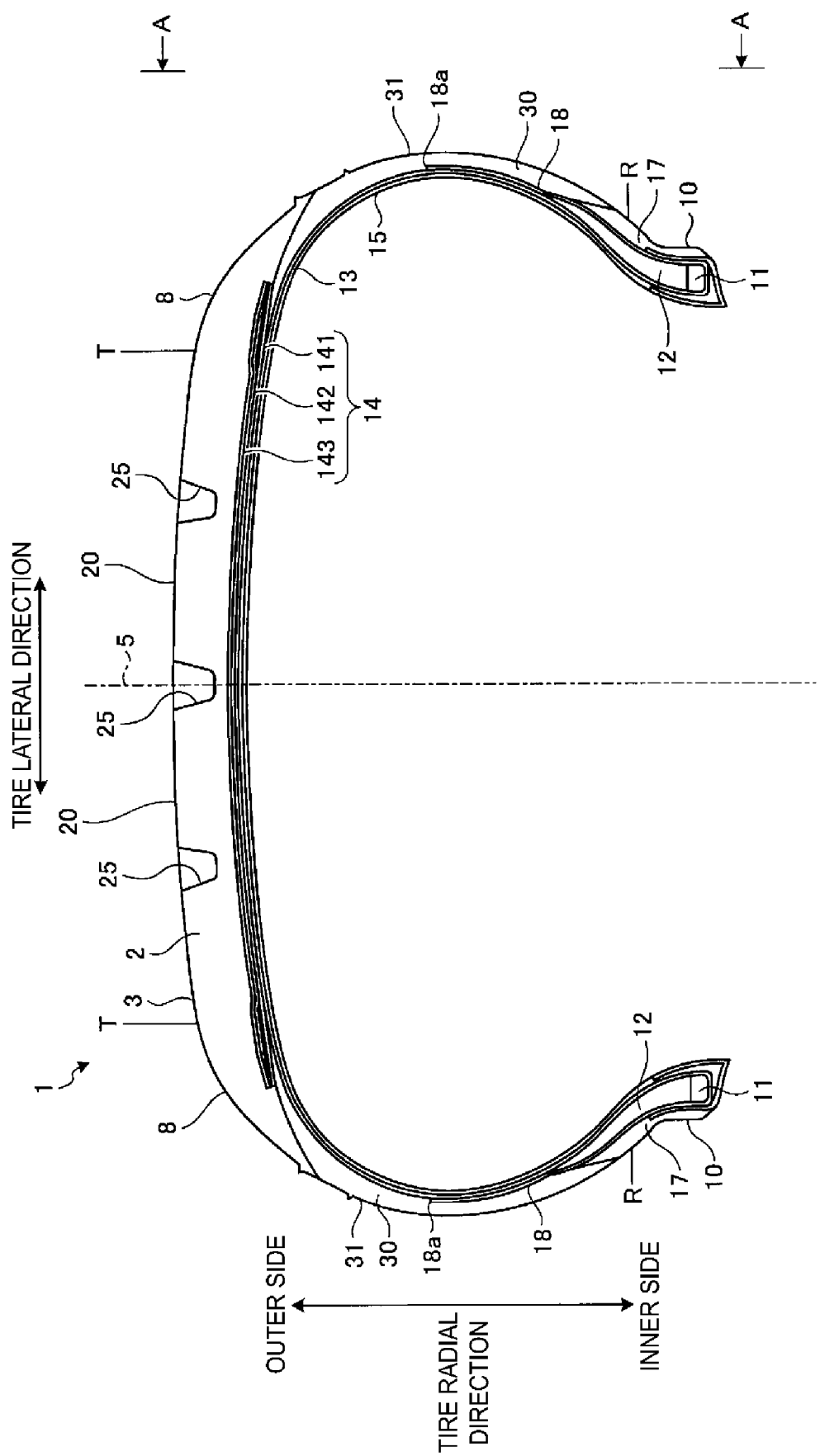
FIG. 1 is a meridian cross-sectional view illustrating a main portion of a pneumatic tire according to an embodiment.

FIG. 1 is a meridian cross-sectional view illustrating a main portion of a pneumatic tire according to an embodiment. A pneumatic tire 1 illustrated in FIG. 1, as viewed in a meridian cross-section, is provided with a tread portion 2 in the outermost portion in the tire radial direction. The surface of the tread portion 2, i.e., the portion that comes into contact with the road surface when a vehicle (not illustrated) mounted with the pneumatic tire 1 travels, is formed as a tread surface 3. In the tread surface 3 of the tread portion 2, a plurality of circumferential main grooves 25 extending in the tire circumferential direction are formed. In the tread surface 3, a plurality of land portions 20 are defined by the circumferential main grooves 25. Grooves other than the circumferential main grooves 25 may be formed in the tread surface 3. Lug grooves (not illustrated) extending in the tire lateral direction, narrow grooves (not illustrated) different from the circumferential main grooves 25, and the like may also be formed.

A shoulder portion 8 is located at both ends of the tread portion 2 in the tire lateral direction. A sidewall portion 30 is disposed inward in the tire radial direction of the shoulder portion 8. In other words, the sidewall portion 30 is disposed in two sections on both sides of the pneumatic tire 1 in the tire lateral direction. The outer surface of the sidewall portion 30 is formed as a tire side portion 31, and the tire side portion 31 is located on both sides in the tire lateral direction. The two tire side portions 31 face the sides opposite from a tire equatorial plane 5 in the tire lateral direction in the respective sidewall portions 30.

"Tire side portion 31" in this case refers to the surface that uniformly continues in a range from a ground contact edge T of the tread portion 2 outward in the tire lateral direction, or, in other words, from a rim check line R outward in the tire radial direction. Additionally, "ground contact edge T" refers to both outermost edges in the tire lateral direction of a region in which the tread surface 3 of the tread portion 2 of the pneumatic tire 1 comes into contact with the road surface with the pneumatic tire 1 mounted on a regular rim, inflated to the regular internal pressure, and loaded with 70% of the regular load. The ground contact edge T continues in the tire circumferential direction. Moreover, "rim check line R" refers to a line used to check whether the tire has been mounted on the rim correctly and, typically, is an annular convex line that continues in the tire circumferential direction along a portion approximate to a rim flange (not illustrated) on a front side surface of a bead portion 10 outward in the tire radial direction of the rim flange.

Note that "regular rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Additionally, "regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

The bead portion 10 is located inward in the tire radial direction of the sidewall portion 30 located on both sides in the tire lateral direction. Similar to the sidewall portion 30, the bead portion 10 is disposed in two sections on both sides of the tire equatorial plane 5. The bead portion 10 is provided with a bead core 11, and a bead filler 12 is disposed outward in the tire radial direction of the bead core 11.

A plurality of belt layers 14 are provided inward of the tread portion 2 in the tire radial direction. The belt layers 14 include a plurality of cross belts 141, 142 and a belt cover 143 and form a multilayer structure. Of these, the cross belts 141 and 142 are made by performing a rolling process on coating a plurality of rubber-covered belt cords made of steel or an organic fiber material. The cross belts 141 and 142 have a belt angle, as an absolute value, ranging from 20° to 55°. Furthermore, the belt cords of the cross belts 141 and 142 have mutually different belt angles. The belt angle is defined as an inclination angle of the fiber direction of the belt cords with respect to the tire circumferential direction. The belts are layered such that the fiber direction of the belt cords intersect one another, i.e., in a crossply structure. The belt cover 143 is made by performing a rolling process on coating rubber-covered cords made of steel or an organic fiber material. The belt cover 143 has a belt angle, as an absolute value, ranging from 0° to 10°. The belt cover 143 is disposed in a layered manner outward of the cross belts 141, 142 in the tire radial direction.

A carcass 13 is disposed in a continuous manner inward of the belt layers 14 in the tire radial direction and on the tire equatorial plane 5 side of the sidewall portion 30. The carcass 13 encapsulates a radial ply cord. The carcass 13 has a single layer structure made of one carcass ply or a multilayer structure made of a plurality of carcass plies, and extends between the bead cores 11 on both sides in the tire lateral direction in a toroidal form, forming the backbone of the tire. Specifically, the carcass 13 is disposed from one bead portion 10 to the other bead portion 10 located on either side in the tire lateral direction, and turned back outward in the tire lateral direction along the bead cores 11 at the bead portions 10, wrapping around the bead cores 11 and the bead fillers 12. The portion of the carcass 13 that is turned back outward in the tire lateral direction along the bead cores 11 is a turned-up portion 18. The turned-up portion 18 extends outward of the bead filler 12 in the tire radial direction. Accordingly, an end portion 18a on the outward in the tire radial direction of the turned-up portion 18 is located outward of the bead filler 12 in the tire radial direction, and is located at or near the portion of the sidewall portion 30 that is the maximum width in the tire lateral direction of the pneumatic tire 1. The carcass ply (plies) of the carcass 13 is made by performing a rolling process on coating rubber-covered carcass cords made of steel or an organic fiber material such as aramid, nylon, polyester, rayon, and the like. The carcass ply (plies) has a carcass angle, i.e., an inclination angle of the fiber direction of the carcass cords with respect to the tire circumferential direction, as an absolute value, ranging from 80° to 95°.

A rim cushion rubber 17 is disposed radially inward and laterally outward of the bead core 11 and a turned back portion of the carcass 13 in the bead portion 10. The rim cushion rubber 17 is the contact surface of the bead portion 10 against the rim flange. Additionally, an innerliner 15 is formed along the carcass 13, inward of the carcass 13, in other words, on the inner side of the carcass 13 in the pneumatic tire 1.

Decorative Portion

Figure 2:
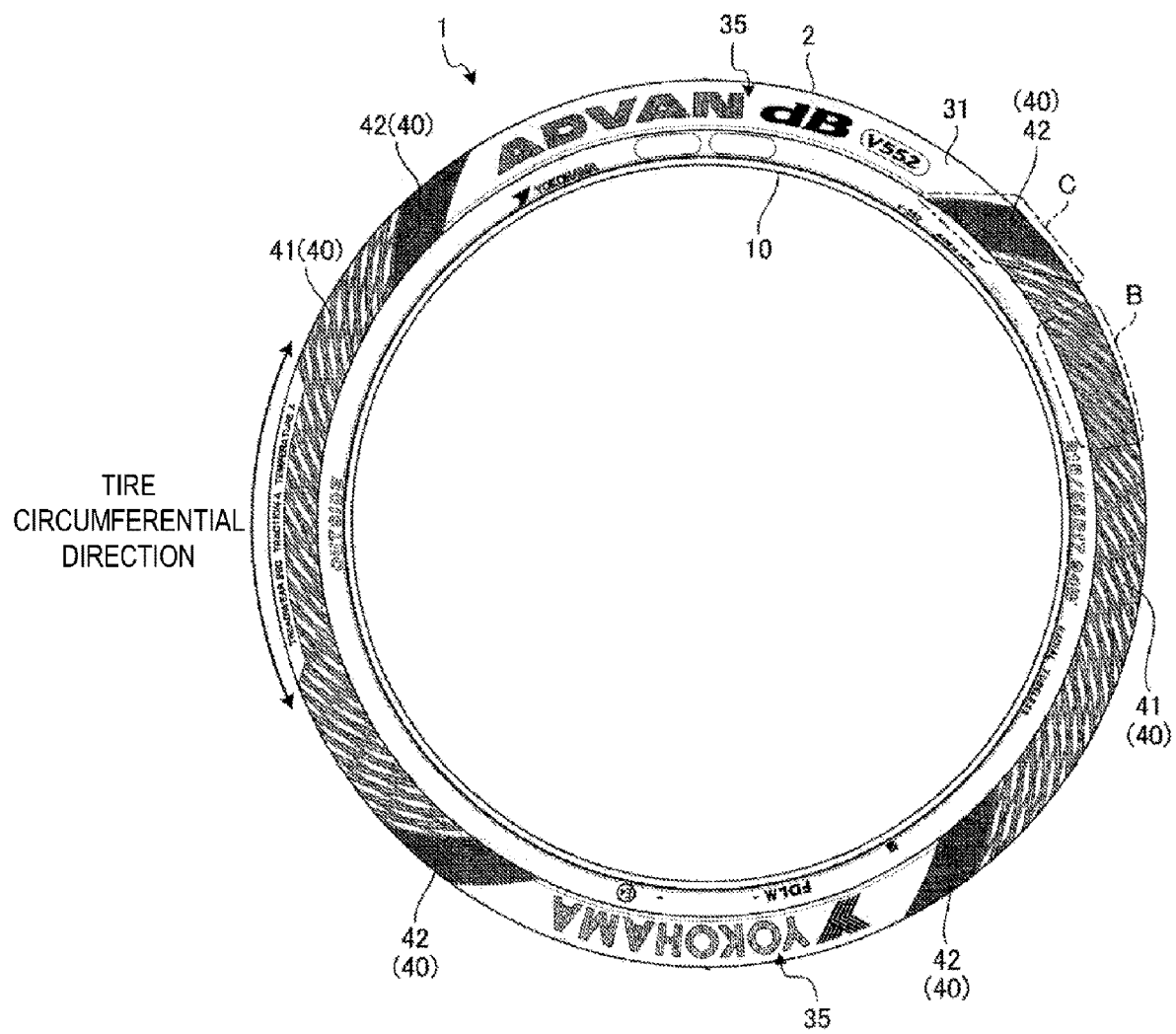
FIG. 2 is a view taken along line A-A of FIG. 1 in the direction of the arrows.

FIG. 2 is a view taken along line A-A of FIG. 1 in the direction of the arrows. An information display portion 35 and a decorative portion 40 are provided on the tire side portion 31 located in two sections on both sides in the tire lateral direction for the purpose of improving the appearance of the pneumatic tire 1 and for displaying various information. The information display portion 35 and the decorative portion 40 are provided in the same form with respect to the tire side portion 31 on both sides in the tire lateral direction. Of these, the information display portion 35 displays various information such as a brand name, a logo mark, and a product name, for identifying the pneumatic tire 1 or informing a user. Additionally, the decorative portion 40 includes a first decorative portion 41 and a second decorative portion 42. The decorative portion 40 is disposed at a position different from the position where the information display portion 35 is provided in the tire circumferential direction with a constant width in the tire radial direction. Note that the information is displayed not only in the information display portion 35, but also in the decorative portion 40 as necessary.

In the present embodiment, the information display portion 35 is provided in two sections of one tire side portion 31 in the tire circumferential direction. The decorative portion 40 is provided in two sections each between the two information display portions 35 in the tire circumferential direction. In other words, the two information display portions 35 are each disposed in the region between the two decorative portions 40 in the tire side portion 31. The lengths in the tire circumferential direction of the range where the two decorative portions 40 are provided are similar to one another, and the lengths in the tire circumferential direction of the range where the two information display portions 35 are provided are also similar to one another. Accordingly, the range of the two sections where the information display portion 35 and the decorative portions 40 are provided in the tire side portion 31 is point-symmetric with respect to the rotation axis of the pneumatic tire 1.

The decorative portions 40 having the first decorative portion 41 and the second decorative portion 42 each include one first decorative portion 41 and two second decorative portions 42. In the first decorative portion 41 and the second decorative portion 42, the length of the second decorative portion 42 in the tire circumferential direction is smaller than the length of the first decorative portion 41 in the tire circumferential direction, and the second decorative portion 42 is disposed in two sections, both sides of the first decorative portion 41 in the tire circumferential direction. In the first decorative portion 41 and the second decorative portion 42, the length of the first decorative portion 41 in the tire circumferential direction is substantially greater than the length of the second decorative portion 42 in the tire circumferential direction. Accordingly, the bulk of the decorative portion 40 is constituted of the first decorative portion 41. Additionally, the ranges where the first decorative portion 41 and the second decorative portion 42 are disposed in the tire radial direction are substantially the same. In other words, the first decorative portion 41 and the second decorative portion 42 have substantially the same width in the tire radial direction.

Figure 3:
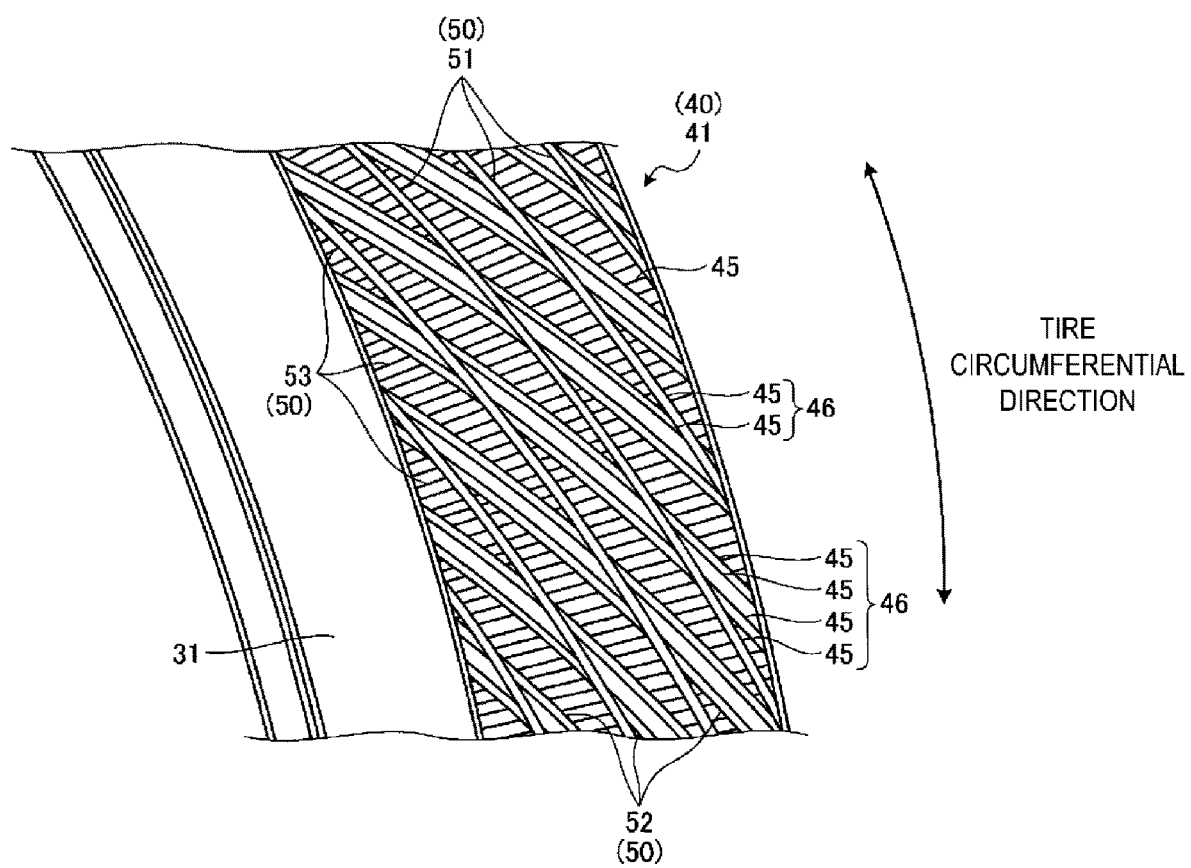
FIG. 3 is a detailed view of portion B of FIG. 2.

FIG. 3 is a detailed view of portion B of FIG. 2. A plurality of ridges 45, are provided in the first decorative portion 41, extend along the tire side portion 31 in a protrusion shape like a mountain ridge, and are arranged side by side in the tire circumferential direction. The ridges 45 protrude outward in the tire lateral direction from the tire side portion 31 and are integrally provided with the tire side portion 31. The inclination angle with respect to the tire radial direction or the inclination angle with respect to the tire circumferential direction is within a predetermined range. Specifically, each of the ridges 45 has a first limit of the inclination angle closer to the tire radial direction and the first limit is the direction along the tire radial direction. The ridge 45 has a second limit of the inclination angle closer to the tire circumferential direction and the second limit is an inclination angle of 5° with respect to the tire circumferential direction. The ridge 45 is formed within these inclination angles. In other words, the ridge 45 is formed with the inclination angle in a range of from 5° to 90° when the tire circumferential direction is 0° and the tire radial direction is 90°.

The ridges 45 provided in the first decorative portion 41 have a plurality of types of the ridges 45. Specifically, a plurality of ridges 45 include a common form of an inclination angle in the tire circumferential direction with respect to the tire radial direction and an interval between a pair of the ridges 45 adjacent and constitute a ridge group 50. Three or more ridge groups 50 are provided in the decorative portion 40. The interval between the ridges 45 here is indicated by the rotation angle about the rotation axis of the pneumatic tire 1, that is, the difference in the relative rotation angles of the ridges 45. Additionally, the difference between the inclination angles of the ridges 45 between ridge groups 50 is preferably 5° or greater. In other words, in the ridge groups 50, the inclination angle of the ridges 45 included in each of the ridge groups 50 in the tire circumferential direction with respect to the tire radial direction is preferably at least 5° between the ridge groups 50 different from one another.

In the present embodiment, three ridge groups 50 are provided in the first decorative section 41. That is, the ridges 45 provided in the first decorative section 41 constitute three ridge groups 50 including a first ridge group 51, a second ridge group 52, and a third ridge group 53. Note that in FIG. 2, the third ridge group 53 is not illustrated in the bulk of the region to facilitate recognition of the first and second ridge groups 51 and 52. The third ridge group 53 is illustrated in only a fraction of the region.

Figure 4:
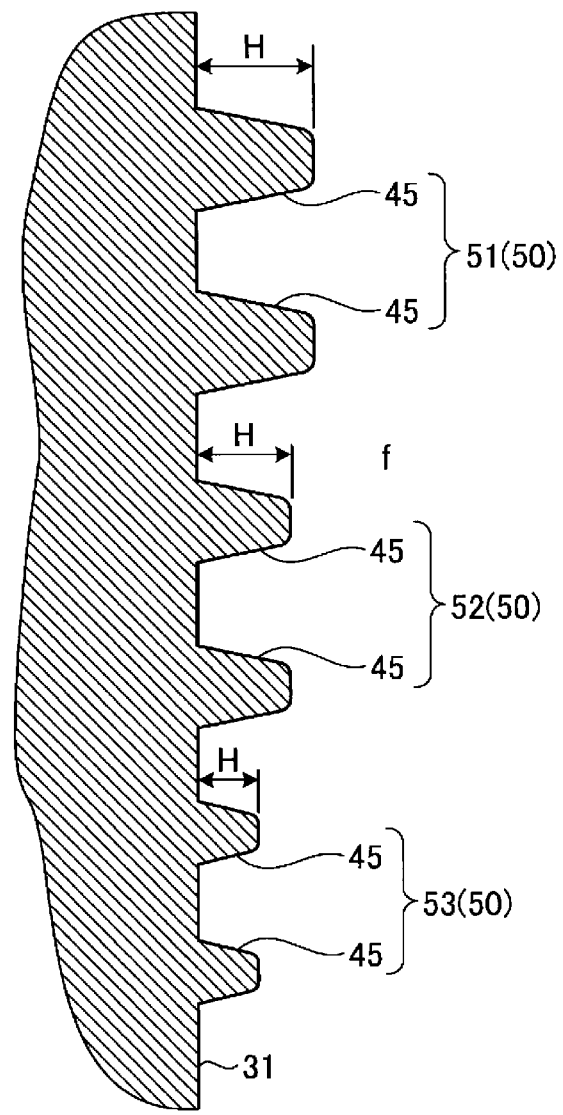
FIG. 4 is a schematic view of the ridges for explaining the height of the ridges illustrated in FIG. 3.

FIG. 4 is a schematic view of the ridges for explaining the height of the ridges illustrated in FIG. 3. The ridges 45 of the first ridge group 51, the ridges 45 of the second ridge group 52, and the ridges 45 of the third ridge group 53 differ from one another in height H from the tire side portion 31. That is, the ridges 45 of the different ridge groups 50 differ from one another in height H. On the other hand, the ridges 45 of the same ridge groups 50 have the same height H. Specifically, among the ridges 45 of the first ridge group 51, the ridges 45 of the second ridge group 52, and the ridges 45 of the third ridge group 53, the ridges 45 of the third ridge group 53 have the lowest height H. The height H of the ridges 45 of the second ridge group 52 is greater than the height H of the ridges 45 of the third ridge group 53, and the height H of the ridges 45 of the first ridge group 51 is greater than the height H of the ridges 45 of the second ridge group 52. In other words, among the ridges 45 of the first ridge group 51, the ridges 45 of the second ridge group 52, and the ridges 45 of the third ridge group 53, the ridges 45 of the first ridge group 51 protrude outermost in the tire lateral direction.

The height H of the ridges 45 is preferably 0.8 mm or less. In other words, the greatest height H of the ridges 45 is preferably 0.8 mm or less. In the present embodiment, the height H of the ridges 45 of the first ridge group 51 is approximately 0.7 mm, the height H of the ridges 45 of the second ridge group 52 is approximately 0.5 mm, and the height H of the ridges 45 of the third ridge group 53 is approximately 0.3 mm.

Additionally, since the inclination angle of the ridges 45 in the tire circumferential direction with respect to the tire radial direction differs among the ridge groups 50, the ridges 45 of different ridge groups 50 are arranged such that they intersect one another.

Of these ridge groups 50, the ridges 45 of the first ridge group 51 are arranged such that they are greatly inclined in the tire circumferential direction with respect to the tire radial direction. Additionally, the ridges 45 of the first ridge group 51 are gently curved in such a direction the inclination angle in the tire circumferential direction with respect to the tire radial direction increases from inward to outward in the tire radial direction.

Additionally, the first ridge group 51 has a plurality of sizes of interval as the interval between the pair of the ridges 45 adjacent, that is, two types of intervals with different sizes. In the first ridge group 51 having two types of interval, when the ridges 45 are arranged side by side in the tire circumferential direction, the ridges 45 are arranged such that a large interval and a small interval between a pair of the ridges 45 adjacent are alternately provided. Specifically, an interval from each of the ridges 45 of the first ridge group 51 to the ridge 45 adjacent on a first side in the tire circumferential direction is a large interval, and another interval from each of the ridges 45 of the first ridge group 51 to the ridge 45 adjacent on a second side in the tire circumferential direction is a small interval.

In this manner, of the ridges 45 arranged with two types of intervals, two ridges 45 adjacent at a small interval form a ridge set 46 that is a single set of ridges. In the first ridge group 51, a plurality of the ridge sets 46 are arranged side by side in the tire circumferential direction. In other words, the ridge sets 46 are arranged such that a pair of the ridge sets 46 adjacent in the tire circumferential direction are arranged at a large interval of the two types of interval between the ridges 45 of the first ridge group 51. In other words, at least one ridge group 50 includes the ridges 45 arranged side by side in a continuous manner in the tire circumferential direction as the ridge set 46 that is a single set of ridges. A plurality of the ridge sets 46 are arranged side by side in the tire circumferential direction at an interval different from the interval between the ridges 45 that form the ridge set 46. In the first ridge group 51, the pair of the ridges 45 adjacent at a small interval of the two types of interval between the ridges 45 form the ridge set 46. A plurality of the ridge sets 46 are arranged side by side in the tire circumferential direction at a large interval different from the interval between the ridges 45 that form the ridge set 46.

In the present embodiment, the pitch of the ridge set 46 of the first ridge group 51 in the tire circumferential direction is approximately 5°. In other words, in the pair of the ridge sets 46 adjacent in the tire circumferential direction, when the relative positional relationship between the ridges 45 located on the same direction side in the tire circumferential direction out of two ridges 45 that form the ridge set 46 is expressed by a rotation angle about the rotation axis of the pneumatic tire 1, the rotation angle between the ridges 45 is approximately 5°.

The ridges 45 of the second ridge group 52 are arranged, in the same manner as the ridges 45 of the first ridge group 51, inclined in the tire circumferential direction with respect to the tire radial direction. However, the inclination angle in the tire circumferential direction with respect to the tire radial direction is smaller than the inclination angle of the ridges 45 of the first ridge group 51 in the tire circumferential direction with respect to the tire radial direction. Specifically, the ridges 45 of the second ridge group 52 are arranged inclined in the same direction as the inclination direction of the ridges 45 of the first ridge group 51 in the tire circumferential direction with respect to the tire radial direction at an inclination angle smaller than the inclination angle of the ridges 45 of the first ridge group 51, in the tire circumferential direction with respect to the tire radial direction. Similar to the ridges 45 of the first ridge group 51, the ridges 45 of the second ridge group 52 are also gently curved in such a direction the inclination angle in the tire circumferential direction with respect to the tire radial direction increases from inward to outward in the tire radial direction.

Additionally, similar to the first ridge group 51, the second ridge group 52 also has a plurality of sizes of interval as the interval between the pair of the ridges 45 adjacent. Moreover, in the second ridge group 52, a plurality of ridges 45 form the ridge set 46. Specifically, the second ridge group 52 has three types of intervals with different sizes, and one ridge set 46 is formed by four ridges 45.

The four ridges 45 forming one ridge set 46 are divided into two pairs of the ridges 45 adjacent. The pair of the ridges 45 adjacent are arranged at the narrowest interval among the three types of intervals. Additionally, two pairs of the ridges 45 each arranged at the narrowest interval are arranged at an intermediate-sized interval among the three types of intervals. That is, four ridges 45 that form one ridge set 46 are divided into two pair of the ridges 45 on both sides in the direction in which the four ridges 45 are arranged side by side, and the pair of the ridges 45 are arranged at the narrowest interval among the three types of intervals. The two pairs of the ridges 45 are arranged at an intermediate-sized interval among the three types of intervals. In other words, of the four ridges 45, the interval between the two ridges 45 adjacent on the center is an intermediate-sized interval among the three types of intervals.

Furthermore, the ridge 46 formed by the four ridges 45 arranged in this manner is arranged adjacent to another ridge set 46 at the largest interval among the three types of intervals. In other words, in the second ridge group 52, when four ridges 45 arranged continuously in the tire circumferential direction form one ridge set 46, the pair of the ridge sets 46 adjacent are arranged at an interval different from the interval between the ridges 45 that form the ridge set 46. That is, a plurality of the ridge sets 46 are arranged side by side in the tire circumferential direction at an interval different from the interval between the ridges 45 that form the ridge set 46.

In the present embodiment, the pitch of the ridge set 46 of the second ridge group 52 in the tire circumferential direction is approximately 3°. In other words, in the pair of the ridge sets 46 adjacent in the tire circumferential direction, when the relative positional relationship between the ridges 45 located on the end portion on the same direction side in the tire circumferential direction out of four ridges 45 that form the ridge set 46 is expressed by a rotation angle about the rotation axis of the pneumatic tire 1, the rotation angle between the ridges 45 is approximately 3°.

The ridges 45 of the second ridge group 52 provided in this manner are not arranged between the two ridges 45 that form the ridge set 46 of the first ridge group 51. In other words, the ridges 45 of the second ridge group 52 are not arranged on a portion between the pair of the ridges 45 adjacent at a smaller interval out of portions between the pair of the ridges 45 adjacent of the first ridge group 51. The ridges 45 of the second ridge group 52 are arranged only between the pair of the ridges 45 adjacent at a larger interval, that is, only between the ridge sets 46 of the first ridge group 51.

The inclination angle in the tire circumferential direction with respect to the tire radial direction of the ridges 45 of the first ridge group 51 differs from that of the ridges 45 of the second ridge group 52. Accordingly, the ridges 45 of the second ridge group 52 arranged between the ridge sets 46 of the first ridge group 51 and the pair of the ridges 45 adjacent at a larger interval in the first ridge group 51 define a region as a substantially parallelogram shape. The region corresponds to a region defined by two ridges 45 adjacent of the second ridge group 52 and two ridges 45 adjacent at a larger interval of the first ridge group 51.

Additionally, an interval between the ridges 45 of the second ridge group 52 and an interval between the ridges 45 of the first ridge group 51 are such that the narrowest interval among the three types of intervals of the second ridge group 52 is substantially equal to the smaller interval of the two types of intervals of the first ridge group 51. Furthermore, the larger interval of the two types of intervals of the first ridge group 51 is larger than the largest interval among the three types of intervals of the second ridge group 52. Since the intervals between the pair of the ridges 45 adjacent have such relationships, of the regions of a parallelogram shape defined by the ridges 45 of the first ridge group 51 and the ridges 45 of the second ridge group 52, the region of a parallelogram shape defined by two ridges 45 adjacent at a larger interval of the first ridge group 51 and two ridges 45 adjacent at the largest interval of the second ridge group 52 has the largest area.

Unlike the first ridge group 51 or the second ridge group 52, the ridges 45 of the third ridge group 53 are formed extending along the tire radial direction. The ridges 45 extending in the tire radial direction are arranged side by side in the tire circumferential direction. Additionally, among all of the ridges 45 of the third ridge group 53, each interval between the pair of the ridges 45 adjacent has an identical size. Specifically, the ridges 45 of the third ridge group 53 are arranged radially, and a plurality of ridges 45 of the third ridge group 53 are arranged side by side at equal intervals in the tire circumferential direction while extending along the tire radial direction.

In the present embodiment, the pitch of the ridges 45 of the third ridge group 53 in the tire circumferential direction is approximately 0.3°. In other words, when the relative positional relationship between the pair of the ridges 45 adjacent in the tire circumferential direction is expressed by a rotation angle about the rotation axis of the pneumatic tire 1, the rotation angle between the pair of the ridges 45 adjacent is approximately 0.3°. Additionally, the ridges 45 of the third ridge group 53 expressed by the interval between the pair of the ridges 45 adjacent at the position radially outer end portion of the ridges 45 is within a range of from 0.8 mm to 1.2 mm.

Additionally, the ridges 45 of the third ridge group 53 are provided only in a region defined by two ridges 45 adjacent at a larger interval in the first ridge group 51 and two ridges 45 adjacent at the largest interval in the second ridge group 52. In other words, the ridges 45 of the third ridge group 53 are arranged only in the region of the parallelogram shape having the largest area among the regions of a parallelogram shape defined by the ridges 45 of the first ridge group 51 and the ridges 45 of the second ridge group 52.

Figure 5:
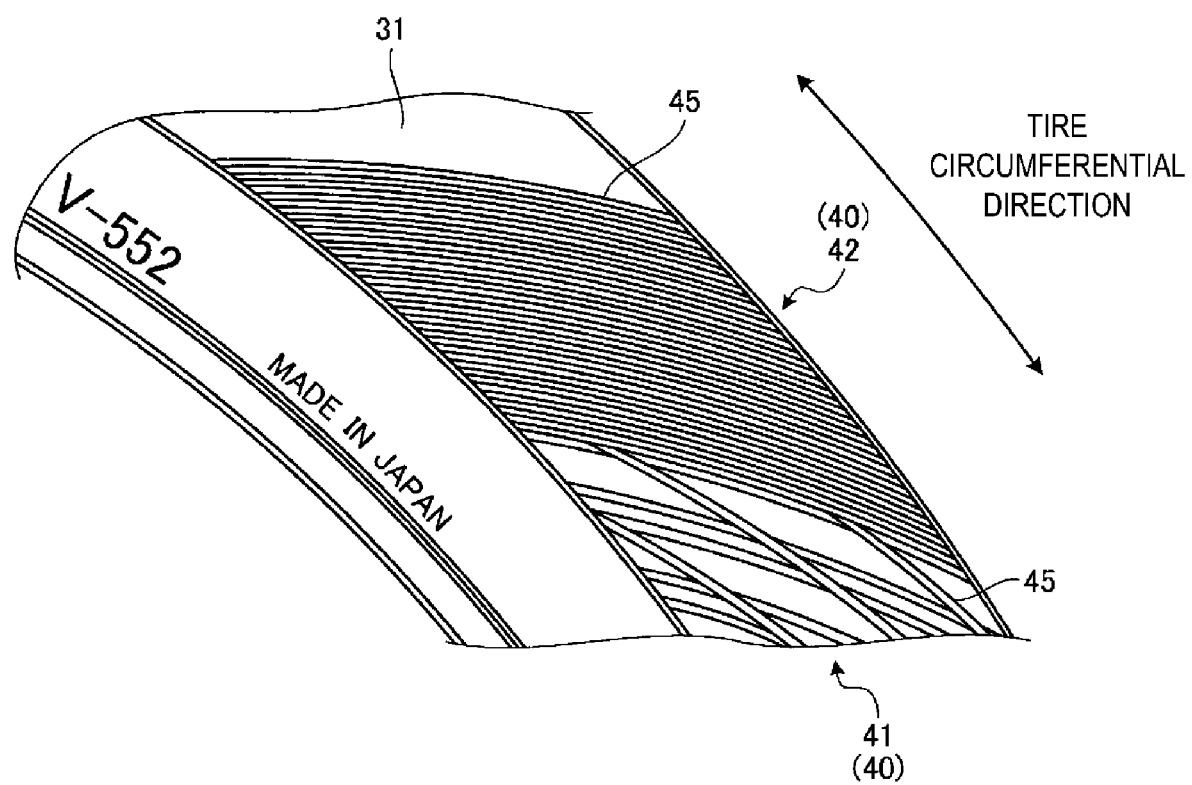
FIG. 5 is a detailed view of portion C of FIG. 2.

FIG. 5 is a detailed view of portion C of FIG. 2. The plurality of ridges 45 are also provided in the second decorative portion 42. The ridges 45 extend along the tire side portion 31 in a protrusion shape like a mountain ridge and are arranged side by side in the tire circumferential direction. Unlike the first decorative portion 41, the second decorative portion 42 is provided with one type of ridge 45. The ridges 45 of the second decorative portion 42 have an inclination direction and an inclination angle in the tire circumferential direction with respect to the tire radial direction, and the magnitude of curve each equal to an inclination direction and an inclination angle in the tire circumferential direction with respect to the tire radial direction and the magnitude of curve of the ridges 45 of the second ridge group 52 in the first decorative portion 41. The interval between the pair of the ridges 45 adjacent in the tire circumferential direction of the ridges 45 in the second decorative portion 42 is smaller than the interval between the pair of the ridges 45 adjacent arranged in the first decorative portion 41.

Additionally, the decorative portion 40 is provided in two sections in one tire side portion 31. The inclination direction in the tire circumferential direction with respect to the tire radial direction of the ridges 45 that incline in the tire circumferential direction of the ridges 45 arranged in the two decorative portions 40, is identical in the two decorative portions 40.

Method for Manufacturing Tire

Figure 6:
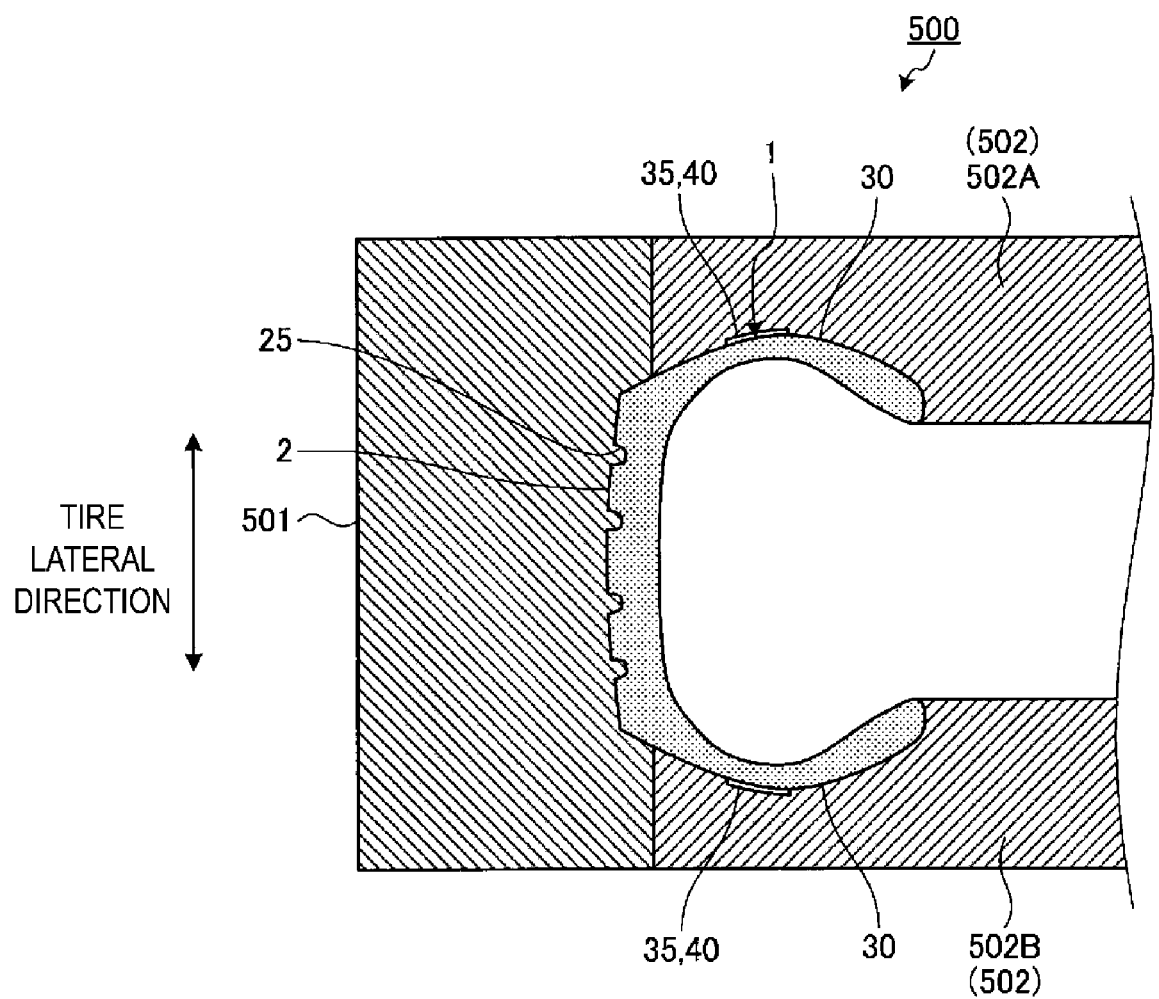
FIG. 6 is a cross-sectional view schematically illustrating a tire mold that is a portion of a system for manufacturing a pneumatic tire.

Next, an example of a method for manufacturing the pneumatic tire 1 according to the present embodiment will be described. FIG. 6 is a cross-sectional view schematically illustrating a tire mold that is a portion of a system for manufacturing a pneumatic tire. The pneumatic tire 1 is manufactured by vulcanization molding a green tire using a mold 500 for vulcanization molding. The green tire is provided inward of the mold 500 and supported by the mold 500 during vulcanization molding. The mold 500 is disposed in tire circumferential direction and includes sector molds 501 and side molds 502. The sector molds 501 form the tread portion 2 of the pneumatic tire 1, and the side molds 502 form the sidewall portion 30 of the pneumatic tire 1.

The sector molds 501 are members of an annular mold divided in the tire circumferential direction. The sector molds 501 are arranged in the tire circumferential direction. Each of the sector molds 501 is movable in the tire radial direction. The sector mold 501 travels inward in the tire radial direction and thus comes into contact with the tread portion 2 of the pneumatic tire 1. The sector mold 501 travels outward in the tire radial direction and thus goes away from the tread portion 2 of the pneumatic tire 1. The sector molds 501 move inward in the tire radial direction to form an integrated annular mold. The sector molds 501 move outward in the tire radial direction to become divided.

The tread portion 2 is molded by the sector mold 501. The sector mold 501 has a projection portion protruding inward in the tire radial direction from the inner surface of the sector mold 501 facing the tread portion 2. The projection portion of the sector mold 501 forms a tread pattern design including the circumferential main groove 25 in the tread portion 2.

The side molds 502 include an upper side mold 502A and a lower side mold 502B. The pneumatic tire 1 is arranged between the upper side mold 502A and the lower side mold 502B. The upper side mold 502A travels upward and thus goes away from the sidewall portion 30 of the pneumatic tire 1. The upper side mold 502A travels downward and thus comes into contact with the sidewall portion 30 of the pneumatic tire 1. The lower side mold 502B travels downward and thus goes away from the sidewall portion 30 of the pneumatic tire 1. The lower side mold 502B travels upward and thus comes into contact with the sidewall portion 30 of the pneumatic tire 1.

The sidewall portion 30 is molded by the side mold 502. The side mold 502 includes a recess and protrusion portion provided on the inner surface of the side mold 502 that faces the sidewall portion 30. The recess and protrusion portion of the side mold 502 forms the information display portion 35 and the decorative portion 40 in the sidewall portion 30.

Action and Effect

The pneumatic tire 1 formed as described above is mounted on a rim wheel that conforms to a regular rim in use, inflated to the regular internal pressure, and mounted on a vehicle. Inside the sidewall portion 30 in the thickness direction, the turned-up portion 18 of the carcass 13 is located. The turned-up portion 18 overlaps a portion inward in the tire lateral direction of the turned-up portion 18 of the carcass 13 in the section outward in the tire radial direction of the bead filler 12. Accordingly, the carcass 13 is disposed having different number of pieces between the portion where the turned-up portion 18 does not overlap and the portion where the turned-up portion 18 overlaps. In other words, the turned-up portion 18 increases the number of pieces on the portion where the turned-up portion 18 overlaps in the carcass 13. Accordingly, in the carcass 13 located on the sidewall portion 30, the portion outward in the tire radial direction of the bead filler 12 is provided such that the thickness of the portion where the turned-up portion 18 does not overlap differs in total thickness from the thickness of the portion where the turned-up portion 18 overlaps. That is, the carcass 13 is disposed having a step.

Specifically, the portion outward in the tire radial direction of the bead filler 12 in the carcass 13 located on the sidewall portion 30, the thickness of the portion located inward in the tire radial direction of the end portion 18a of the turned-up portion 18 is greater in total thickness than the thickness of the portion located outward in the tire radial direction of the end portion 18a of the turned-up portion 18. Accordingly, when tension is generated in the sidewall portion 30 by performing inflation, a variation in thickness of the carcass 13 may appear in the tire side portion 31 that is the outer surface of the sidewall portion 30.

In other words, in the tire side portion 31, similar to the variation in thickness of the carcass 13, the portion outward in the tire radial direction of the portion where the turned-up portion 18 of the carcass 13 is located in the tire side portion 31 may be recessed inward in the tire lateral direction of the portion where the turned-up portion 18 is located. A recess may be generated in the tire side portion 31 due to the step of the carcass 13 in this manner. Even when the pneumatic tire 1 is mounted on a vehicle, the tire side portion 31 located outward in the mounting direction of the vehicle of two tire side portions 31 can be visually recognized. Accordingly, when any recess is generated in the tire side portion 31, the recess can also be visually recognized.

On the tire side portion 31, the decorative portion 40 is provided in which a plurality of ridges 45 are formed. The first decorative portion 41 of the decorative portions 40 includes three ridge groups 50 each having different forms from one another of an inclination angle in the tire circumferential direction with respect to the tire radial direction and an interval between the pair of the ridges 45 adjacent. The ridges 45 of different ridge groups 50 are thus arranged such that they intersect one another. Accordingly, in the portion where the first decorative portion 41 is provided, the ridges 45 have a large difference in density depending on the position in the first decorative portion 41. The shape of the tire side portion 31 can thus be hardly determined due to the difference in density of the ridges 45, and the recess of the tire side portion 31 can hardly be recognized.

Figure 7:
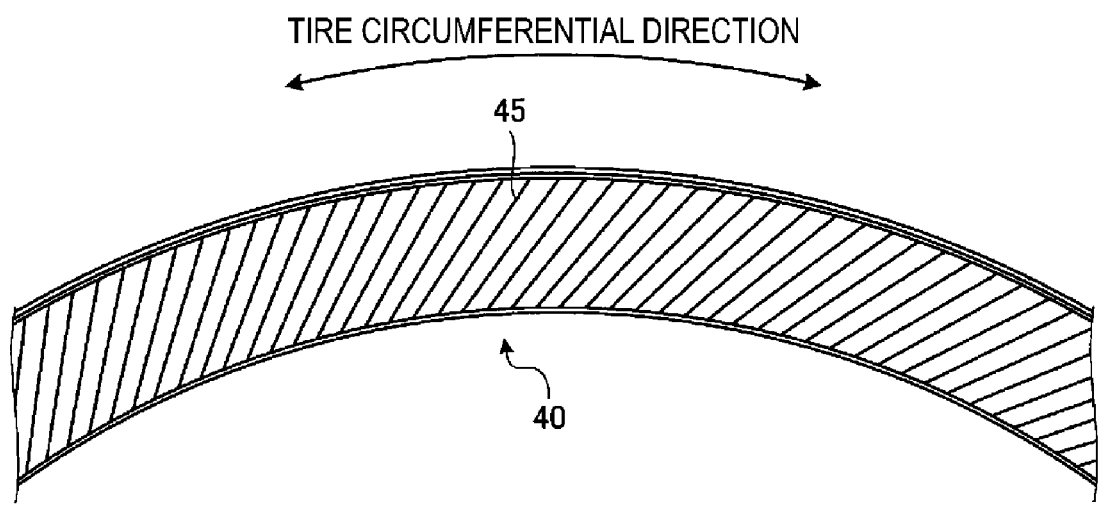
FIG. 7 is an explanatory diagram in a case where one type arrangement pattern of ridges is provided.
Figure 8:
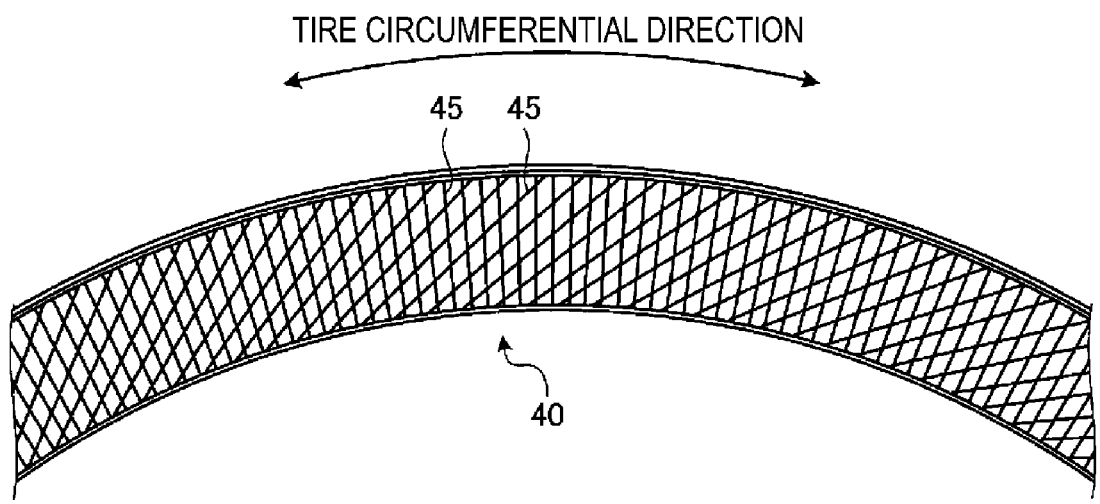
FIG. 8 is an explanatory diagram in a case where two types of arrangement patterns of ridges are provided.
Figure 9:
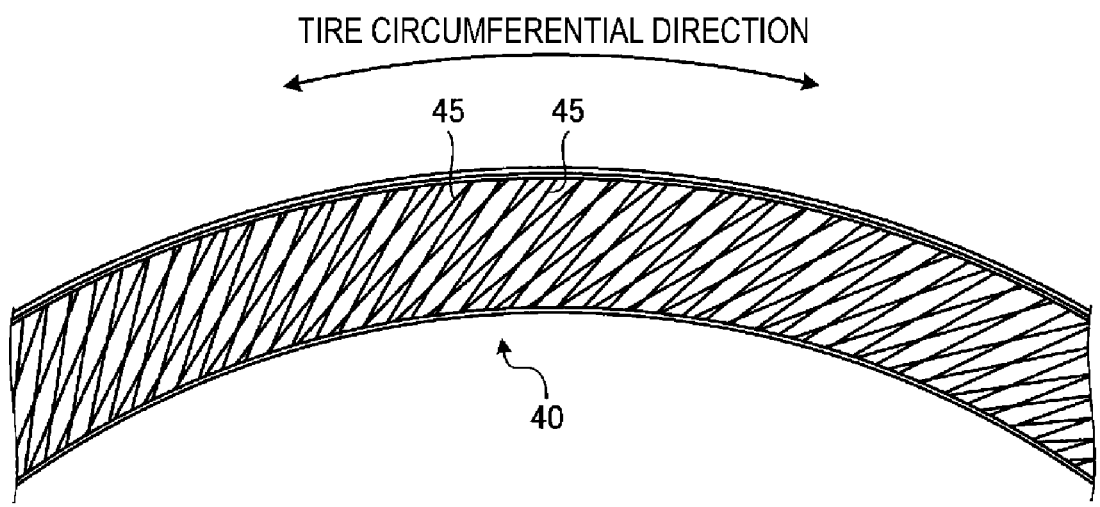
FIG. 9 is an explanatory diagram in a case where two types of arrangement patterns of ridges are provided.

In other words, even when the ridges 45 are formed in the tire side portion 31, when the ridges 45 have few arrangement patterns, the variation in density of the ridges 45 is monotonic. FIG. 7 is an explanatory diagram in a case where the arrangement pattern of ridges is one type. FIG. 8 is an explanatory diagram in a case where two types of arrangement patterns of ridges are provided. FIG. 9 is an explanatory diagram in a case where two types of arrangement patterns of ridges are provided. For example, as illustrated in FIG. 7, when the ridges 45 are arranged side by side in the tire circumferential direction with a constant inclination angle in the tire circumferential direction with respect to the tire radial direction, the ridges 45 have little variation in density. The portion where the ridges 45 are arranged and portions where the ridges 45 are not arranged only form a striped shape, thus the appearance is also monotonic.

Additionally, as illustrated in FIG. 8, in a case where two types of ridges 45 having different inclination angles in the tire circumferential direction with respect to the tire radial direction are formed such that they intersect one another, the ridges 45 only form regions in a rectangular shape. The ridges 45 have thus little variation in density. Furthermore, in the case where two types of ridges 45 having different inclination angles in the tire circumferential direction with respect to the tire radial direction intersect one another, when the ridges 45 have little difference in the relative inclination angles, as illustrated in FIG. 9, the density of the ridges 45 increases in the region of the portion where the ridges 45 intersect one another. However, the portions where the ridges 45 intersect one another are arranged in a tidy manner, thus the manner of variation in density is also monotonic.

In contrast, in the present embodiment, the first decorative portion 41 includes three ridge groups 50. The inclination angle in the tire circumferential direction with respect to the tire radial direction of the ridges 45 that constitute each of the ridge groups 50 differs among the three ridge groups 50. Accordingly, the portions where the ridges 45 intersect one another also have three types of differences in the relative inclination angles between ridges 45 intersecting one another. That is, the portions where the ridges 45 intersect one another have the following three types of portions: the portion where the ridges 45 of the first ridge group 51 intersect the ridges 45 of the second ridge group 52; the portion where the ridges 45 of the first ridge group 51 intersect the ridges 45 of the third ridge group 53; and the portion where the ridges 45 of the second ridge group 52 intersect the ridges 45 of the third ridge group 53. Accordingly, variation in density of the ridges 45 is multiplex.

Furthermore, the interval between the pair of the ridges 45 adjacent of the ridge groups 50 differs among the three ridge groups 50. The density of the ridges 45 in the portion where the ridges 45 intersect one another differs depending on not only the relative inclination angle between ridges 45 intersecting one another, but also the interval between the pair of the ridges 45 adjacent. Accordingly, the variation in density of the ridges 45 is more multiplex. For example, the density of the ridges 45 increases in the portion where the pair of the ridges 45 adjacent having a smaller interval intersect one another. In contrast, the density of the ridges 45 decreases in the portion where the pair of the ridges 45 adjacent having a larger interval intersect one another. Additionally, of the ridges 45 intersecting one another, in the portion where a first pair of the ridges 45 adjacent have a smaller interval and a second pair of the ridges 45 adjacent have a larger interval, the density of the ridges 45 is about intermediate between the density in the portion where two pairs of the ridges 45 adjacent each having a smaller interval intersect one another and the density in the portion where two pairs of the ridges 45 adjacent each having a larger interval intersect one another.

Furthermore, among the three ridge groups 50, the interval between the pair of the ridges 45 adjacent differs, thus the positions where the pair of the ridges 45 intersect one another can thus be dispersed. In other words, the distribution of the density of the ridges 45 can be dispersed.

In this manner as described above, in the pneumatic tire 1 according to the present embodiment, the tire side portion 31 has a large variation in density of the ridges 45 depending on the position in the first decorative portion 41, and thus the variation in density on the first decorative portion 41 is also multiplex. Accordingly, the appearance of the tire side portion 31 varies depending on the position in the first decorative portion 41. In this way, even when any recess is generated in the tire side portion 31, the recess is less likely to be visually recognized due to the variation in density of the ridges 45. As a result, poor appearance of the sidewall portion 30 can be reduced.

Additionally, the inclination angle of the ridges 45 in the tire circumferential direction with respect to the tire radial direction differs among the three ridge groups 50 in the first decorative portion 41. Furthermore, the interval between the pair of the ridges 45 adjacent differs among the three ridge groups 50. Accordingly, an interference pattern, which is referred to as moiré, is easily generated. In this way, the recess in the tire side portion 31 is further less noticeable, and poor appearance of the sidewall portion 30 can be more reliably reduced.

Additionally, by arranging the ridges 45 to intersect with one another in the three ridge groups 50 in the first decorative portion 41, more number of ridges 45 can be arranged in comparison with a case where the arrangement pattern of the ridges 45 is one. In this way, poor vulcanization during vulcanization molding can be reduced. In other words, the decorative portion 40 is formed by pressing the side mold 502 of the mold 500 against the sidewall portion 30 of the green tire during vulcanization molding, and the recess and protrusion portion corresponding to the ridges 45 in the decorative portion 40 are formed in the side mold 502. Accordingly, to arrange a large number of ridges 45 in the decorative portion 40, a large number of recess and protrusion portions need to be formed in the side mold 502. Forming a large number of recess and protrusion portions in the side mold 502 thus increases the surface area of the side mold 502. In this way, during vulcanization molding, the contact area between the green tire and the mold 500 increases. The heat for vulcanization can thus be easily transferred from the mold 500 to the green tire, and the green tire can be sufficiently heated. As a result, poor vulcanization caused by insufficient heating of the green tire during vulcanization molding can be reduced.

Additionally, the ridges 45 of the same ridge group 50 have an identical height to one another, and the ridges 45 of the different ridge groups 50 have different heights from one another. Arrangement of the ridges 45 of the different ridge groups 50 in different forms is thus likely to be recognized. In this way, the pattern of the decorative portion 40 formed by the ridges 45 is clear. Even in a case where any recess is generated in the tire side portion 31, the recess is less likely to be recognized. As a result, poor appearance of the sidewall portion 30 can be more reliably reduced.

Additionally, the first ridge group 51 and the second ridge group 52 have a plurality of sizes of interval as an interval between the pair of the ridges 45 adjacent. The variation in density of the ridges 45 can be more reliably increased. In this way, the appearance of the tire side portion 31 can be more reliably varied depending on the position in the first decorative portion 41. Even when any recess is generated in the tire side portion 31, the recess is further less likely to be visually recognized. As a result, poor appearance of the sidewall portion 30 can be more reliably reduced.

Additionally, the first ridge group 51 and the second ridge group 52 each include the ridge set 46 formed by the ridges 45 arranged side by side continuously in the tire circumferential direction. In the first ridge group 51 and the second ridge group 52, a plurality of the ridge sets 46 are arranged side by side in the tire circumferential direction at an interval different from the interval between the ridges 45 that form the ridge set 46. In this way, the pattern of the decorative portion 40 formed by the ridge sets 46 is clear. Even in a case where any recess is generated in the tire side portion 31, the recess is less likely to be recognized. As a result, poor appearance of the sidewall portion 30 can be more reliably reduced.

Additionally, the ridges 45 of the third ridge group 53 are not arranged between the ridges 45 that form the ridge set 46 of the first ridge group 51 or between the ridges 45 that form the ridge set 46 of the second ridge group 52. The ridges 45 of the first ridge group 51 and the ridges 45 of the second ridge group 52 are thus noticeable. In this way, the pattern of the decorative portion 40 formed by the ridges 45 is more clear. Even in a case where any recess is generated in the tire side portion 31, the recess is less likely to be recognized. As a result, poor appearance of the sidewall portion 30 can be more reliably reduced.

Additionally, the ridges 45 of the third ridge group 53 are not arranged between the ridges 45 that form the ridge set 46 of the first ridge group 51 or between the ridges 45 that form the ridge set 46 of the second ridge group 52. Accordingly, the ridges 45 of the third ridge group 53 are not arranged in the portions where the ridges 45 have a narrow interval in the first ridge group 51 or the second ridge group 52. Manufacturing the portion that forms the decorative portion 40 in the mold 500 can thus be facilitated. As a result, an increase in manufacturing cost for applying a design to reduce poor appearance of the sidewall portion 30 can be suppressed.

Additionally, the ridges 45 of the third ridge group 53 are not arranged in the portions where the ridges 45 have a narrow interval in the first ridge group 51 or the second ridge group 52. Forming a recessed portion with a very small area in the tire side portion 31 can thus be suppressed. In this way, poor vulcanization caused by air accumulating in the recessed portion with a small area during vulcanization molding can be suppressed. As a result, the failure rate during manufacture of the pneumatic tire 1 can be reduced.

MODIFIED EXAMPLES

Note that in an embodiment described above, the ridges 45 of the first ridge group 51 and the ridges 45 of the second ridge group 52 in the first decorative portion 41 have an identical inclination direction to one another in the tire circumferential direction with respect to the tire radial direction. However, the ridges 45 of the first ridge group 51 and the ridges 45 of the second ridge group 52 may have inclination directions opposite from one another in the tire circumferential direction with respect to the tire radial direction. Additionally, the ridges 45 of the third ridge group 53 extend along the tire radial direction on the tire side portion 31. However, the ridges 45 of the third ridge group 53 may be inclined in the tire circumferential direction. The ridges 45 of the first ridge group 51, the ridges 45 of the second ridge group 52, and the ridges 45 of the third ridge group 53 may have any inclination direction or inclination angle other than the inclination direction and inclination angle according to an embodiment described above. It is only required that the ridges 45 of the first ridge group 51, the ridges 45 of the second ridge group 52, and the ridges 45 of the third ridge group 53 have different inclination angles from one another in the tire circumferential direction and thus the variation in density of the ridges 45 is multiplex.

Additionally, in an embodiment described above, the ridges 45 of the first ridge group 51 and the ridges 45 of the second ridge group 52 in the first decorative portion 41 constitute the ridge set 46 formed by a plurality of ridges 45. However, the ridges 45 in the decorative portion 40 need not constitute the ridge set 46. FIGS. 10 to 13 are explanatory diagrams of a decorative portion in a case where the ridges do not form a ridge set. In the decorative portion 40, in a case where three ridge groups 50 are arranged in the same manner as in an embodiment, as illustrated in FIGS. 10 to 13, the ridges 45 of the ridge group 50 may be arranged at equal intervals in the tire circumferential direction for each of the ridge group 50 without forming the ridge set 46.

Figure 10:
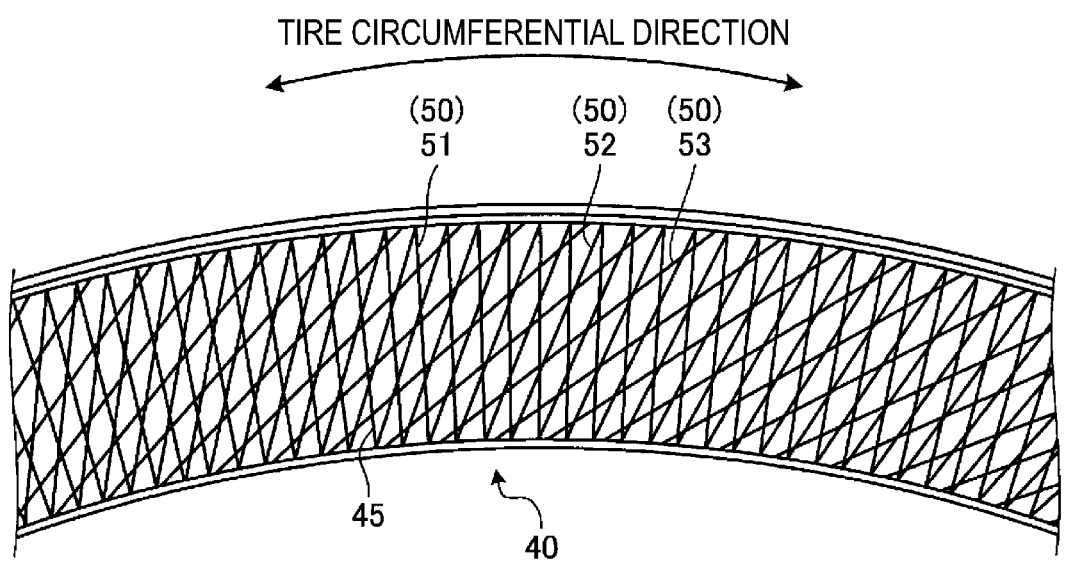
FIG. 10 is an explanatory diagram of a decorative portion in a case where ridges do not form a ridge set.
Figure 11:
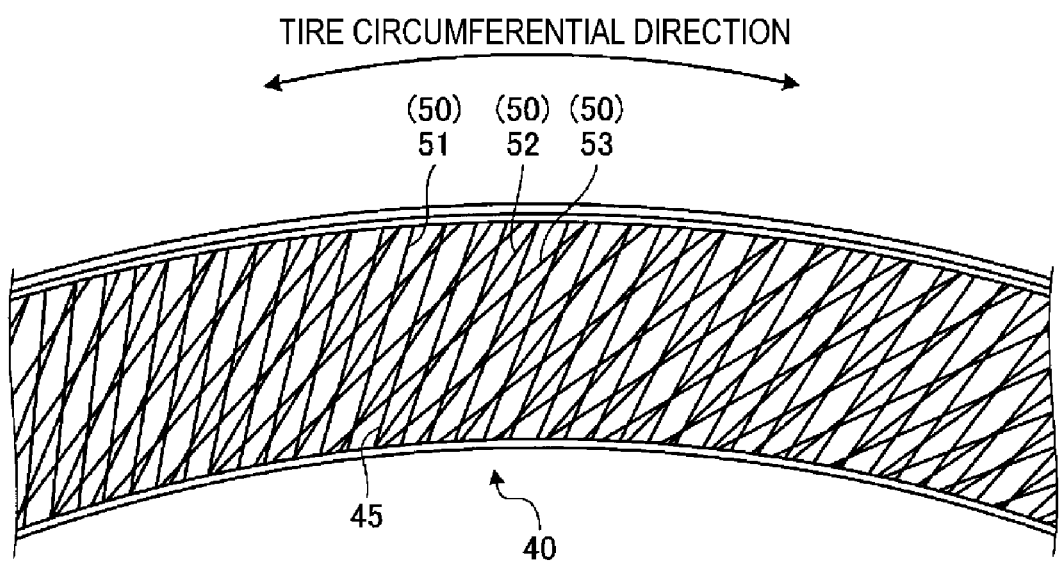
FIG. 11 is an explanatory diagram of a decorative portion in a case where ridges do not form a ridge set.
Figure 12:
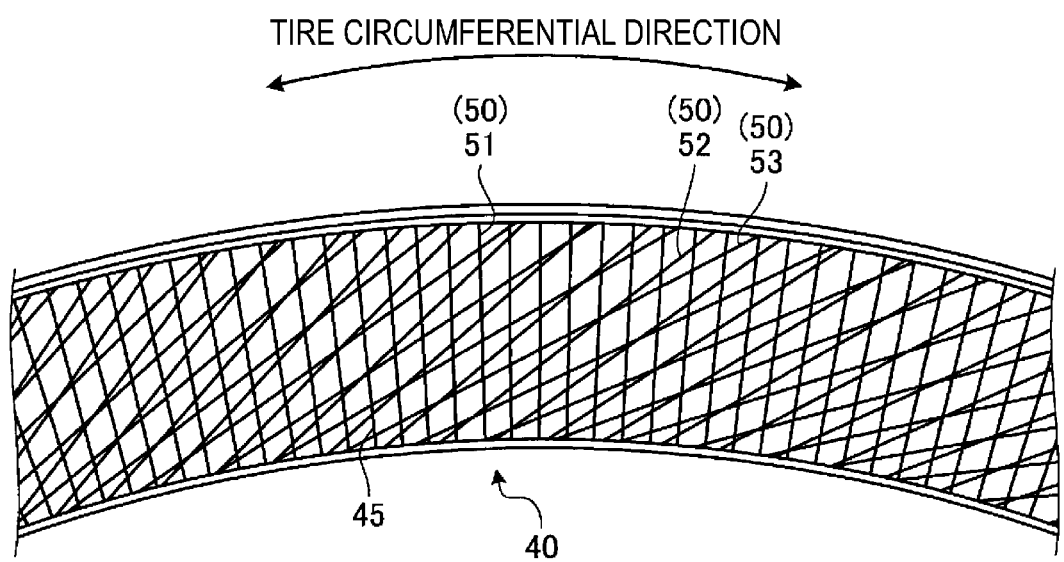
FIG. 12 is an explanatory diagram of a decorative portion in a case where ridges do not form a ridge set.

In this case, for example, as illustrated in FIG. 10, the inclination direction of the ridges 45 of some of the ridge groups 50 in the tire circumferential direction with respect to the tire radial direction and the inclination direction of the ridges 45 of other of the ridge groups 50 in the tire circumferential direction with respect to the tire radial direction may be opposite from one another. And as illustrated in FIG. 11, all of the ridge groups 50 may have the same inclination direction of the ridges 45 in the tire circumferential direction with respect to the tire radial direction. Also, the ridges 45 in the decorative portion 40 need not always be inclined in the tire circumferential direction with respect to the tire radial direction. And as illustrated in FIG. 12, the ridges 45 of some of the ridge groups 50 may be formed substantially along the tire radial direction.

Figure 13:
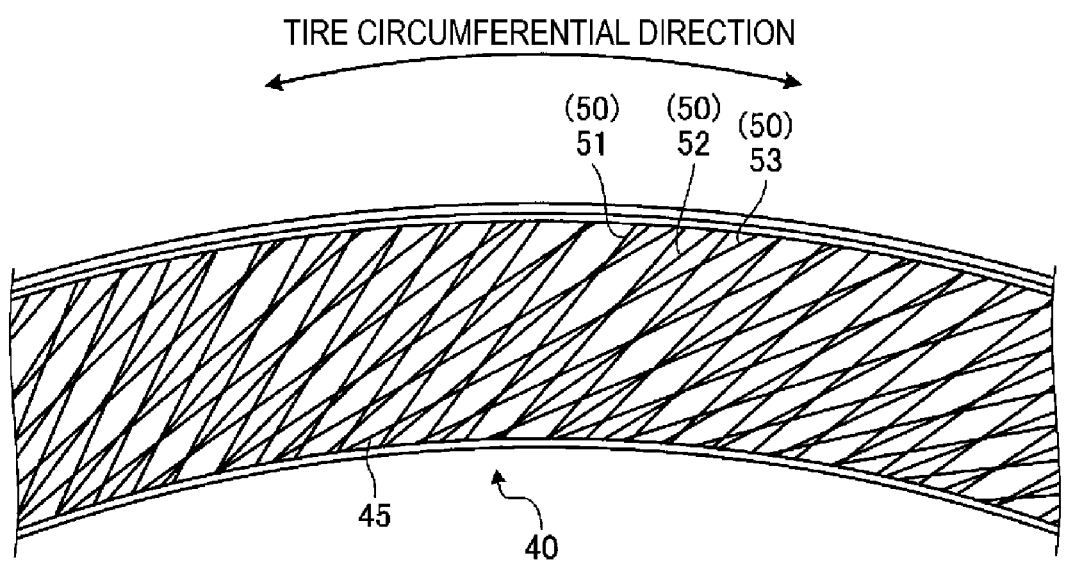
FIG. 13 is an explanatory diagram of a decorative portion in a case where ridges do not form a ridge set.

Additionally, as illustrated in FIG. 13, the ridges 45 of the three ridge groups 50 may be formed at angles which are proximate to one another in the tire circumferential direction. Forming the ridges 45 of the three ridge groups 50 at angles which are proximate to one another facilitates a large variation in density of the ridges 45. Accordingly, even when any recess is generated in the tire side portion 31, the recess is less likely to be recognized, and poor appearance of the sidewall portion 30 can be reduced.

Figure 14:
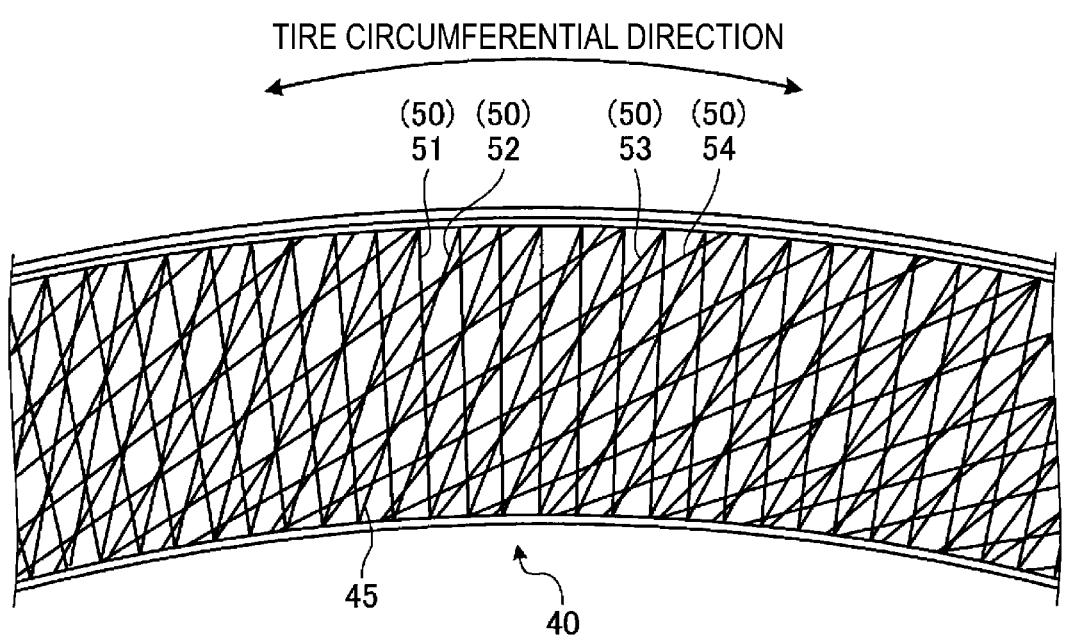
FIG. 14 is an explanatory diagram in a case where a decorative portion has four ridge groups.
Figure 15:
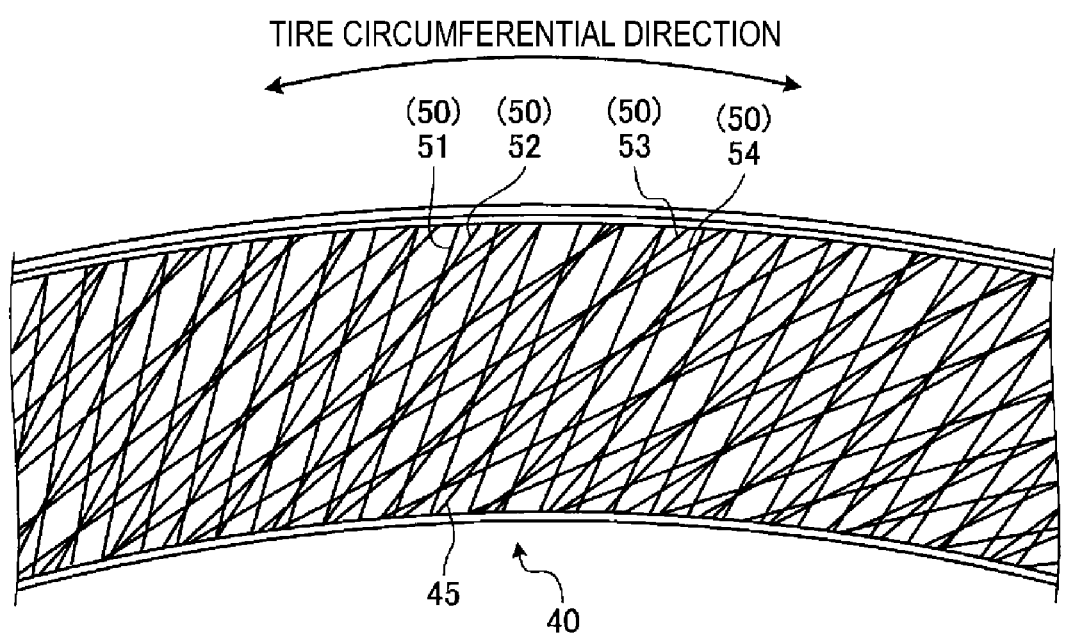
FIG. 15 is an explanatory diagram in a case where a decorative portion has four ridge groups.
Figure 16:
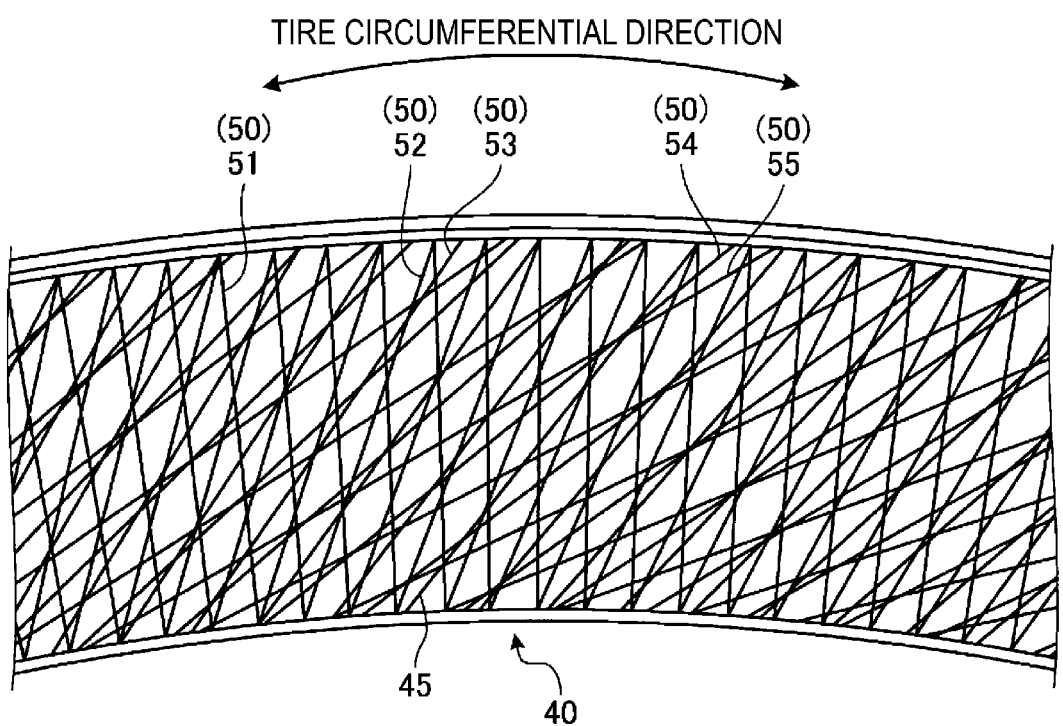
FIG. 16 is an explanatory diagram in a case where a decorative portion has five ridge groups.

Additionally, the number of ridge groups 50 in the decorative portion 40 may be other than three. FIGS. 14 and 15 are explanatory diagrams in a case where a decorative portion has four ridge groups. FIG. 16 is an explanatory diagram in a case where a decorative portion has five ridge groups. The ridges 45 in the decorative portion 40 may be arranged, for example, as illustrated in FIGS. 14 and 15, such that they constitute four ridge groups 50 of the first ridge group 51, the second ridge group 52, the third ridge group 53, and a fourth ridge group 54. The four ridge groups 50 have different inclination angles from one another in the tire circumferential direction with respect to the tire radial direction and different intervals from one another between the pair of the ridges 45 adjacent. Alternatively, as illustrated in FIG. 16, the ridges 45 in the decorative portion 40 may be arranged, such that they constitute five ridge groups 50 of the first ridge group 51, the second ridge group 52, the third ridge group 53, the fourth ridge group 54, and a fifth ridge group 55. The five ridge groups 50 have different inclination angles from one another in the tire circumferential direction with respect to the tire radial direction and different intervals from one another between the pair of the ridges 45 adjacent. Additionally, as illustrated in FIG. 14, also in a case where the number of ridge groups 50 provided is other than three, the inclination direction of the ridges 45 of some of the ridge groups 50 in the tire circumferential direction with respect to the tire radial direction and the inclination direction of the ridges 45 of other of the ridge groups 50 in the tire circumferential direction with respect to the tire radial direction may be opposite from one another. And as illustrated in FIG. 15, all of the ridge groups 50 may have the same inclination direction of the ridges 45 in the tire circumferential direction with respect to the tire radial direction.

In this manner, also in a case where the number of ridge groups 50 provided in the decorative portion 40 is four or more, the greatest height H of the ridge 45 is preferably 0.8 mm or less. In a case where a plurality of ridge groups 50 having different heights H are provided, heights in a plurality of stages are set within the maximum height. Accordingly, the difference in height H of the ridges 45 among the ridge groups 50 decreases as the number of ridge groups 50 increases.

In a case where a large number of ridge groups 50 are arranged in the decorative portion 40, moiré is easily generated. Even when any recess is generated in the tire side portion 31, the recess is thus further less noticeable. In this way, poor appearance of the sidewall portion 30 can be more reliably reduced. Additionally, in a case where a large number of ridge groups 50 are arranged in the decorative portion 40, the contact area between the green tire and the mold 500 during vulcanization molding increases. The heat of the mold 500 can be thus efficiently transferred to the green tire. In this way, poor vulcanization caused by insufficient heating of the green tire during vulcanization molding can be more reliably reduced.

Note that in a case where the number of ridge groups 50 in the decorative portion 40 is other than three, the number of ridge groups 50 is preferably five or less. In a case where the number of ridge groups 50 exceeds six, the difference in the inclination angle and height among the ridges 45 of the different ridge groups 50 is too small. Thus, the difference among the ridge groups 50 may hardly be recognized. Additionally, in a case where the number of ridge groups 50 is increased, an amount of work for operation applied to the mold 500 to form the ridge 45 by the mold 500 is increased. In a case where the number of the ridge group 50 exceeds six, the difference among the ridge groups 50 may hardly be recognized. Accordingly, an effect of the increased amount of work can hardly be obtained with respect to the increment of amount of work applied to the mold 500. In other words, an effect of reducing the poor appearance of the sidewall portion 30 due to the variation in density of the ridges 45 or the moiré can hardly be obtained with respect to the labor and cost for increasing the number of ridge groups 50. Accordingly, the number of ridge groups 50 formed in the decorative portion 40 is preferably from three to five.

Additionally, in the pneumatic tire 1 according to an embodiment described above, the decorative portion 40 includes the first decorative portion 41 and the second decorative portion 42. However, the decorative portion 40 need not include the second decorative portion 42. The decorative portion 40 may be constituted by only three or more ridge groups 50 without the second decorative portion 42 constituted by one type of ridge 45.

Furthermore, in the pneumatic tire 1 according to an embodiment described above, the decorative portions 40 provided in two sections on one tire side portion 31 have the same form as one another. However, the decorative portions 40 provided on one tire side portion 31 may have different forms from one another. In other words, between the decorative portions 40, the angle or interval of the ridges 45 that form the decorative portion 40, the number of ridge groups 50, the number of ridges 45 that form the ridge set 46, or the size of the decorative portions 40 may differ from one another.

Additionally, in the pneumatic tire 1 according to an embodiment described above, the decorative portion 40 is provided in two sections on one tire side portion 31. However, the number of decorative portions 40 provided on one tire side portion 31 may be other than two. For example, the decorative portions 40 may be provided in three or more sections on one tire side portion 31, or the decorative portion 40 may be provided in one section on one tire side portion 31. In a case where the decorative portion 40 is provided in one section on one tire side portion 31, the decorative portion 40 may be provided on a partial region of the tire side portion 31 in the tire circumferential direction, or the decorative portion 40 may be provided throughout the circumference in the tire circumferential direction. In a case where the decorative portion 40 is provided throughout the circumference in the tire circumferential direction and the information display portion 35 is also provided, the information display portion 35 may be provided at a position different from that of the decorative portion 40 in the tire radial direction, or the information display portion 35 may be provided in the decorative portion 40.

Additionally, in the pneumatic tire 1 according to an embodiment described above, the information display portion 35 and the decorative portion 40 are provided in the same form in the tire side portion 31 in two sections, both sides in the tire lateral direction. However, the information display portion 35 and the decorative portion 40 in the tire side portion 31 may be provided in different forms from one another in two sections, both sides in the tire lateral direction. By providing different information display portions 35 or decorative portions 40 for each of the tire side portions 31, design quality can be improved, and difficulty in visibility of the recess in the tire side portion 31 caused by the decorative portion 40 can be increased.

Examples

FIGS. 17A and 17B are tables showing results of performance tests of a pneumatic tire according to an embodiment. In relation to the pneumatic tire 1 described above, performance evaluation tests conducted on a pneumatic tire of Conventional Example, the pneumatic tire 1 according to an embodiment of the present technology, and a pneumatic tire of Comparative Example compared with the pneumatic tire 1 according to an embodiment of the present technology will be described below. The performance evaluation tests were evaluated for the difficulty in visibility of the recess in the tire side portion 31.

In the performance evaluation tests, the pneumatic tires 1 having a size of 215/55R17 94W were mounted on rim wheels of a JATMA standard rim having a size of 17×6.5JJ, and wheels were inflated to 210 kPa. The evaluation tests of the difficulty in visibility of the recess in the tire side portion 31 generated due to the step of the carcass 13 were evaluated by visual observation of an evaluator after inflation of each of the pneumatic tires to be tested. The visibility evaluation results were calculated as index values with the difficulty in visibility of the recess in the tire side portion 31 of the pneumatic tire of the below-described Conventional Example being assigned the value of 100. Larger values indicate less visibility of the recess in the tire side portion 31 generated due to the step of the carcass 13.

The evaluation tests were performed on 14 types of pneumatic tires that were the pneumatic tire of Conventional Example as one example of a conventional pneumatic tire, Examples 1 to 12 that are each the pneumatic tire 1 according to an embodiment of the present technology, and Comparative Example that is the pneumatic tire compared with the pneumatic tires 1 according to an embodiment of the present technology. In the pneumatic tire 1 to be tested in the evaluation tests, the decorative portion 40 is provided on all of the tire side portions 31 and a plurality of ridges 45 are formed in the decorative portion 40. In the pneumatic tire of Conventional Example, the number of ridge groups 50 in the decorative portion 40 is one. Additionally, in the pneumatic tire of the Comparative Example, the number of ridge groups 50 in the decorative portion 40 is two.

In contrast, in Examples 1 to 12 that are each an example of the pneumatic tire 1 according to an embodiment of the present technology, the number of ridge groups 50 in the decorative portion 40 is three or more. Furthermore, among the pneumatic tires 1 according to Examples 1 to 12, the number of ridge groups 50 in the decorative portion 40, presence of any difference in height of the ridges 45 among the ridge groups 50, and whether the ridge group 50 has a plurality of intervals between the ridges 45, are different.

As a result of performing the evaluation tests on these pneumatic tires 1, as illustrated in FIGS. 17A and 17B, it was found that in the pneumatic tire 1 according to Examples 1 to 12, the recess in the tire side portion 31 generated due to the step of the carcass 13 has a lower visibility in comparison with Conventional Example or Comparative Example. In other words, in the pneumatic tire 1 according to Examples 1 to 12, poor appearance of the sidewall portion 30 can be reduced.

The invention claimed is:

1. A pneumatic tire comprising:
   a decorative portion disposed on a tire side portion that is an outer surface of a sidewall portion;
   the decorative portion comprising a plurality of ridges that extend along the tire side portion, the plurality of ridges being arranged side by side in a tire circumferential direction;
   the plurality of ridges comprising a parallel inclination angle in the tire circumferential direction with respect to a tire radial direction and an interval between a pair of the plurality of ridges adjacent to one another, the plurality of ridges forming a ridge group, and three or more different ridge groups are provided; and the plurality of ridges of the different ridge groups are arranged intersecting one another;

the plurality of ridges of a first ridge group of the different ridge groups each extending in a longitudinal direction without interruption by any of the plurality of ridges of a second ridge group of the different ridge groups and without interruption by any of the plurality of ridges of a third ridge group of the different ridge groups, the plurality of ridges of the second ridge group each extending in a longitudinal direction interrupted by the plurality of ridges of the first ridge group and extending without interruption by the plurality of ridges of the third ridge group, the plurality of ridges of the third ridge group extending in a longitudinal direction interrupted by the plurality of ridges of the first ridge group or the second ridge group, the plurality of ridges of the first ridge group comprising adjacent pairs of adjacent ridges, the adjacent pairs each being defined in part by a ridge shared by each of the adjacent pairs, and a pattern between the adjacent ridges is the same for each of the adjacent pairs, the pattern being defined by the plurality of ridges of the second ridge group and the plurality of ridges of the third ridge group.

2. The pneumatic tire according to claim 1, wherein
the plurality of ridges of a same one of the three or more ridge groups have an identical height to one another; and
the plurality of ridges of the different ridge groups have different heights.

3. The pneumatic tire according to claim 1, wherein at least one of the ridge groups has a plurality of different interval sizes of intervals between respective different pairs of the plurality of ridges adjacent to one another.

4. The pneumatic tire according to claim 3, wherein the at least one of the ridge groups comprising the plurality of different interval sizes of intervals between the respective different pairs of the plurality of ridges adjacent to one another has a ridge set formed by the plurality of ridges arranged side by side in a continuous manner in the tire circumferential direction, and a plurality of the ridge sets are arranged side by side in the tire circumferential direction at an interval different from an interval between the plurality of ridges that form the ridge set.

5. The pneumatic tire according to claim 2, wherein at least one of the ridge groups has a plurality of different interval sizes of intervals between respective different pairs of the plurality of ridges adjacent to one another.

6. The pneumatic tire according to claim 5, wherein the at least one of the ridge groups comprising the plurality of different interval sizes of intervals between the respective different pairs of the plurality of ridges adjacent to one another has a ridge set formed by the plurality of ridges arranged side by side in a continuous manner in the tire circumferential direction, and a plurality of the ridge sets are arranged side by side in the tire circumferential direction at an interval different from an interval between the plurality of ridges that form the ridge set.

7. The pneumatic tire according to claim 4, wherein the plurality of the ridge sets arranged side by side in the tire circumferential direction at the interval different from the interval between the plurality of ridges that form the ridge set each comprise sets of only two ridges.

* * * * *